May 19, 1970  H. C. FLINT  3,512,831
SPRING SEAT

Filed Aug. 24, 1964  5 Sheets-Sheet 1

INVENTOR.
Hyland C. Flint
BY
Barnard, McGlynn & Reising
ATTORNEYS

May 19, 1970  H. C. FLINT  3,512,831
SPRING SEAT

Filed Aug. 24, 1964  5 Sheets-Sheet 2

INVENTOR.
Hyland C. Flint
BY
Barnard, McGlynn & Reising
ATTORNEYS

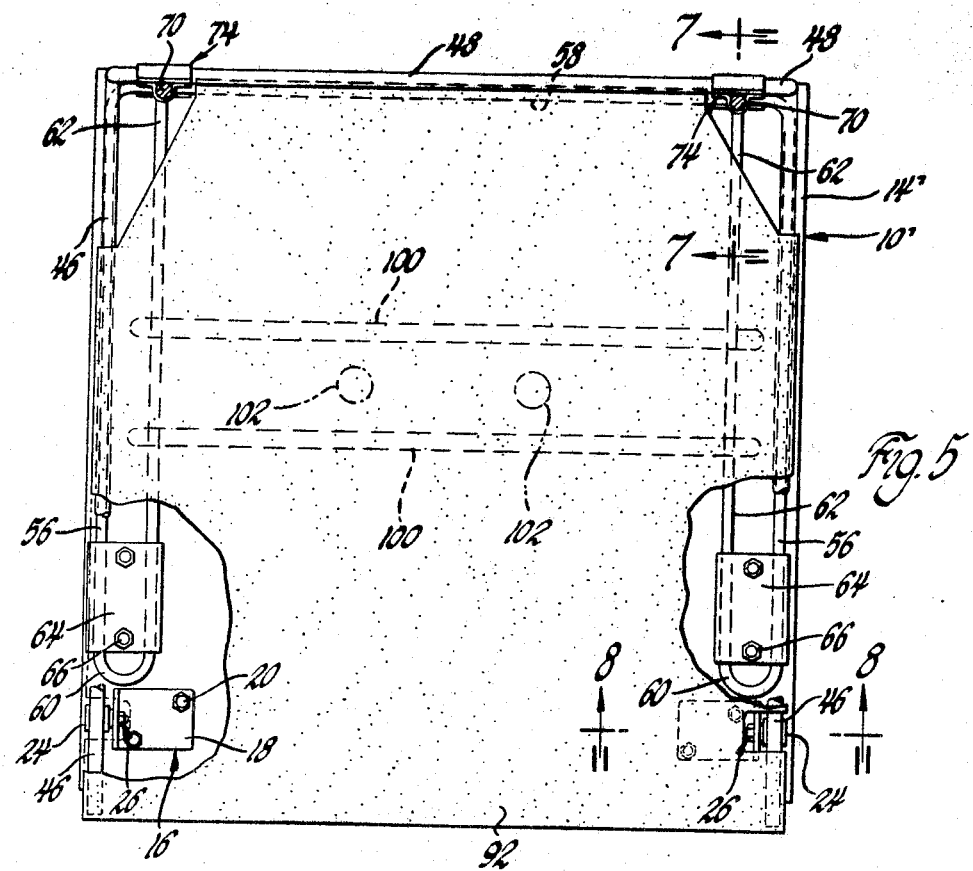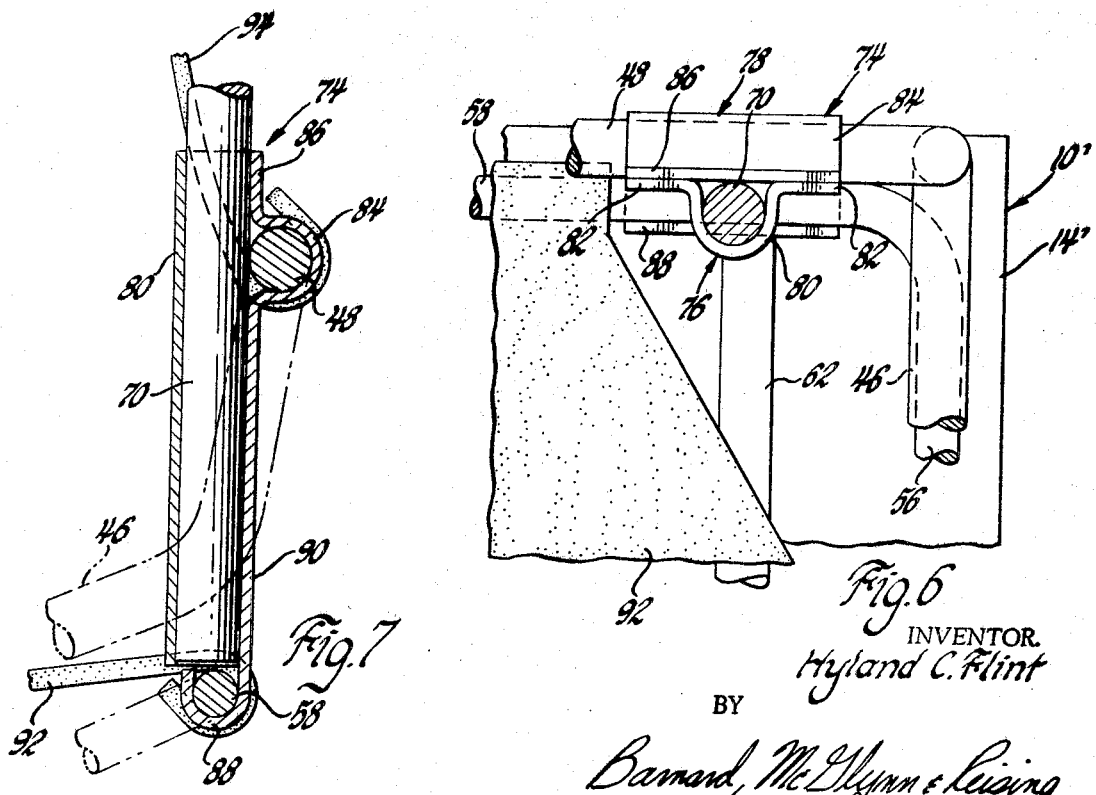

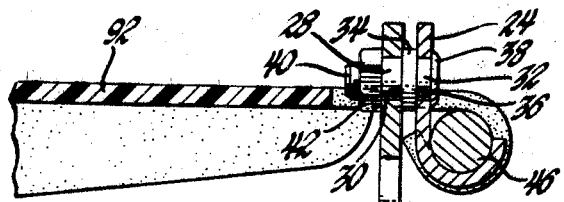
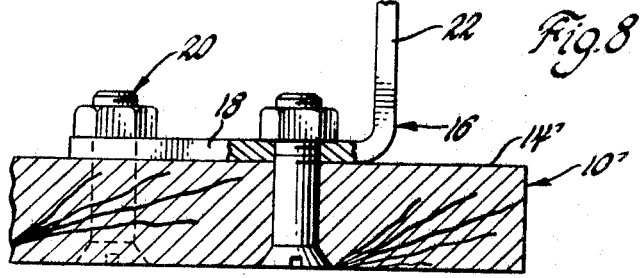
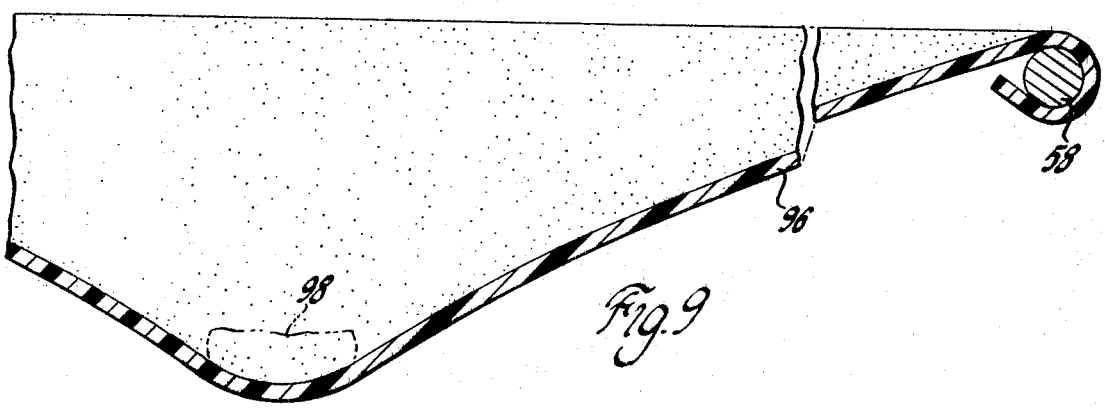
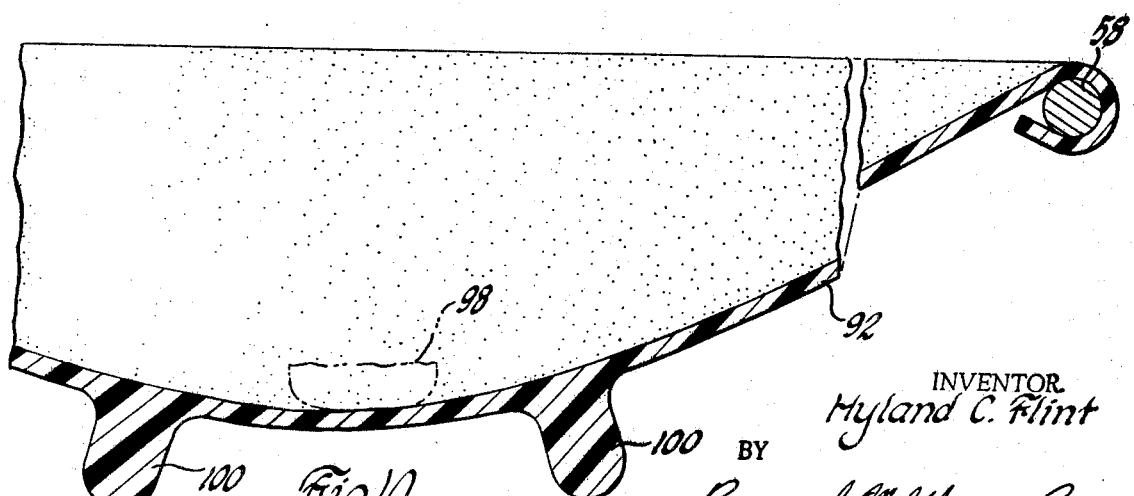

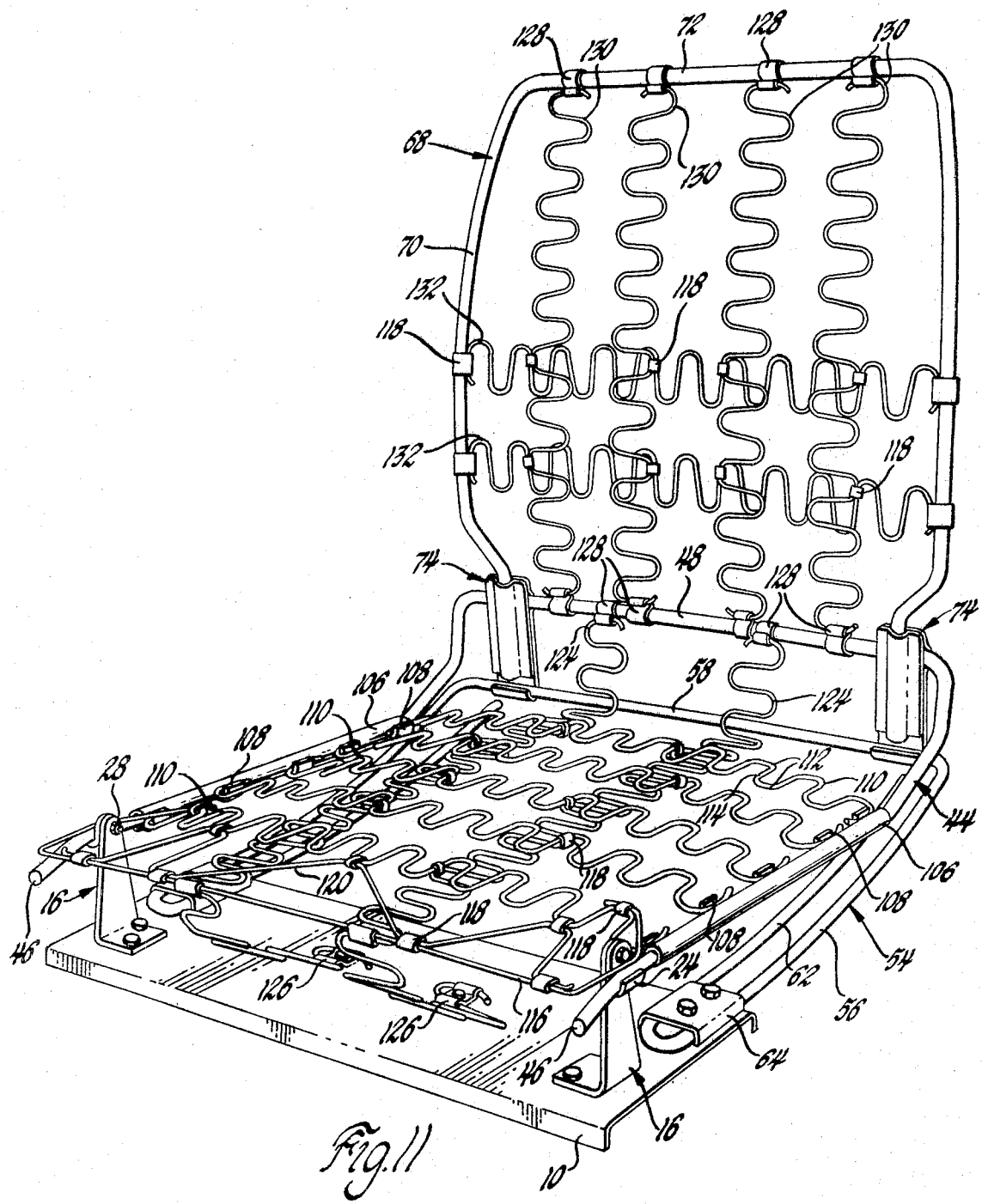

United States Patent Office 3,512,831
Patented May 19, 1970

3,512,831
SPRING SEAT
Hyland C. Flint, 3551 Walnut Lake Road, Rte. 2,
Orchard Lake, Mich. 48033
Filed Aug. 24, 1964, Ser. No. 391,518
Int. Cl. 47b 3/10
U.S. Cl. 297—309    41 Claims The usual seat structure, in either a vehicle seat or as a piece of furniture, is a complicated and bulky affair with rigid border frames for supporting the usual springs and cushions in both the seat and the back support structure. It is highly desirable, particularly in vehicle seating, to provide seat structures that are of suitable strength and resilience to support a seated person and provide a comfortable seating condition. In the past, it has been the practice to provide a rigid and strong base structure on which is disposed a complicated and cumbersome seat cushion, such cushions including border frames and the like, numerous springs, and being of extreme depth to provide the desired resilience and comfort. Such structures are obviously expensive. Furthermore, such structures take up a considerable amount of space; and in vehicles where available space is limited, roominess must be sacrificed for comfort in the seat structure.

The device in which this invention is embodied comprises, generally, a unison action seat structure formed of three U-shaped elements having a degree of resilience in themselves and so disposed as to provide much of the resilience required for the seat structure. The first of these U-shaped elements is a seat support wire extending rearwardly from a base member. The second U-shaped element is a wire suspension spring, secured to the base element and extending rearwardly in spaced relation to the seat support wire. The third U-shaped element is a backrest frame which is pivotally secured to both the seat support wire and the suspension spring at the rear of the seat structure and is disposed in such a manner as to move upwardly and downwardly with the seat support wire against the force of the suspension spring without a substantial change in angularity between the back support wire and the seat support wire, and maintaining substantially vertical movement of the back support wire (i.e. maintaining its angularity relative to the base).

The cross member portion of the backrest wire is thus yieldable to a degree which eliminates the need for extreme depth of cushions or springs normally required. The horizontal movement of the top cross member need only be enough to avoid any hardness being felt through a relatively thin pad of foam material or other cushion structure. Any pressure rearwardly at the cross member passes by direct contact to the seat support wire and through the seat support wire to the base member through the pivot support thereon. At the same time, when the seat structure is used as a vehicle seat, the resilience of the various elements effectively damps out road vibrations and the like which would otherwise be transmitted to the seat structure and be felt by the occupant of the seat.

With a slight modification in the base structure, the suspension spring can be made variable as the load on the seat increases. That is, by providing a base structure that extends rearwardly of the seat and beneath the legs of the suspension spring, the spring will progressively decrease its effective length and become stiffer as the load increases. On the other hand, should the additional stiffness be unnecessary, the base may be conveniently formed of a short member only of sufficient length to provide attachment means for the seat support wire and the legs of the suspension spring.

With a construction of this type, extremely simple cushioning is all that is required and may be in the form of foam rubber material, or other such materials, of substantially half the thickness usually required in present seating. The cushions may be supported on flexible sheets extending between the legs of the U-shaped seat support wire and the U-shaped back cushion support, or may be disposed on sinuous wire springs suitably secured in the open spaces. Such structures are extremely compact and avoid the usual bulk normally found in present day seating. Furthermore, due to the few number of pieces necessary to make the structure, the resulting assembly is extremely inexpensive to manufacture and assemble.

These and other advantages will become more apparent from the following description and drawings in which:

FIG. 5 is a plan view with parts broken away and in section, taken substantially along the line 5—5 of FIG. 4 of the seat constructions illustrated in FIGS. 1 through 4.

FIG. 6 is an enlarged view of a portion of the structure shown in FIG. 5 to illustrate the connection between the back support and seat support wires.

FIG. 7 is a cross sctional view of a portion of the seat constructions illustrated in FIGS. 1 through 5, taken substantially along the line 7—7 of FIG. 5 and looking in the direction of the arrows.

FIG. 8 is a cross sectional view of another portion of the seat structures illustrated in FIGS. 1 through 5, taken substantially along the line 8—8 of FIG. 5 and looking in the direction of the arrows.

FIG. 9 is a cross sectional diagrammmatic view of a typical flexible seat cushion supporting member.

FIG. 10 is a cross sectional diagrammatic view of the flexible seat cushion support member utilized in the seat construction of FIGS. 1 through 5 and illustrating the differences over the usual structure as in FIG. 9.

FIG. 11 is a perspective view of a modified form of the seat structure illustrated in FIGS. 2 through 5 showing sinuous wire springs forming the seat cushion support.

Figure 1:
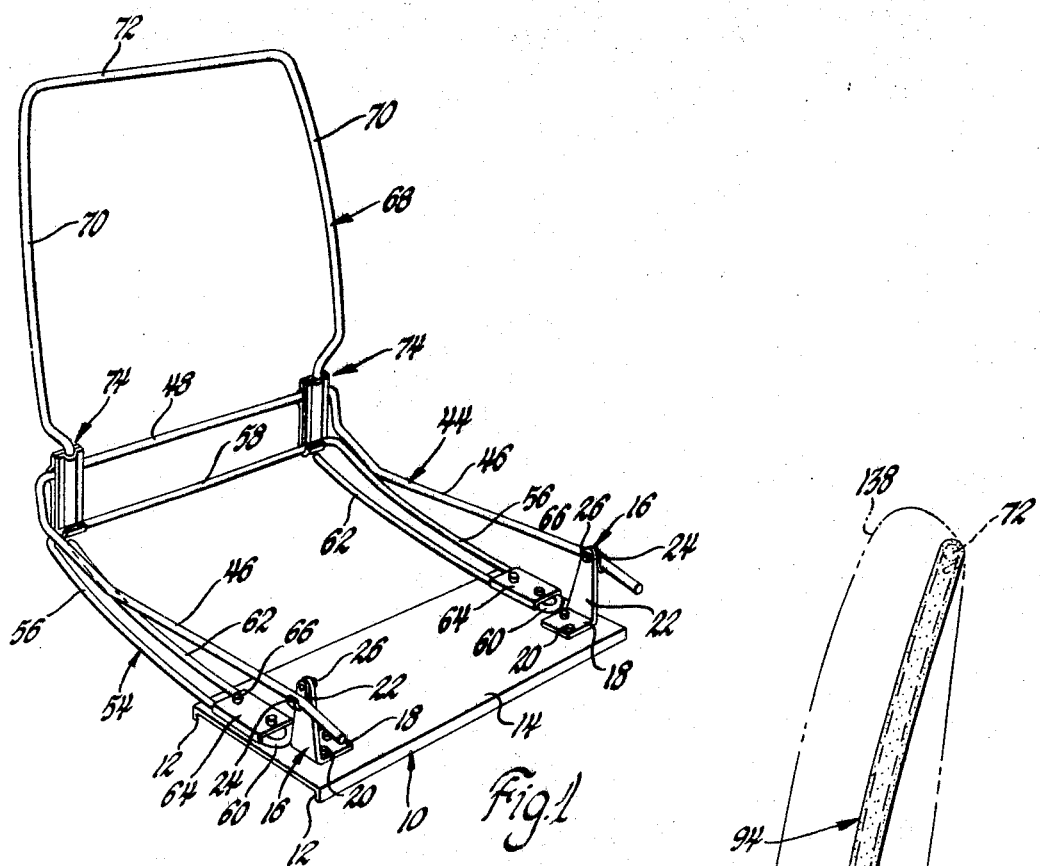
FIG. 1 is a perspective view of the basic seat structure without the cushioning or seat support members to show the various U-shaped elements and with one form of base structure.

Referring more particularly to the drawings, FIGS. 1 through 5 best illustrate the simplicity of the seat structure. A base member, illustrated generally by the numeral 10, is formed of a channel section having downturned flanges 12 and a web portion 14. Secured on the web portion 14 and at opposite sides thereof are a pair of brackets, illustrated generally by the numeral 16, secured to the base 10 by means of inwardly directed flanges 18 and nut and bolt assemblies 20. Extending upwardly from flanges 18 are post portions 22, to which U-shaped clips 24 are pivotally secured by pivot pins 26.

Referring particularly to FIG. 8, pivot pins 26 are shown to include a shank portion 28 disposed within a suitable aperture 30 in the post portion 22. A second shank portion 32, separated from shank portion 28 by an enlarged flange 34, is received in an aperture 36 formed in the U-shaped clip 24. The end 38 of pivot pin 26 is peened or otherwise enlarged to retain the U-shaped clip 24 on the pin 26 between the flange 34 and the end 38. At the opposite end of pin 26 is a threaded portion 40 which receives a suitable nut 42 to secure the entire assembly in place. The U-shaped clip 24 is freely pivotable about the shank portion 32 for purposes to become hereinafter more apparent.

Figure 2:
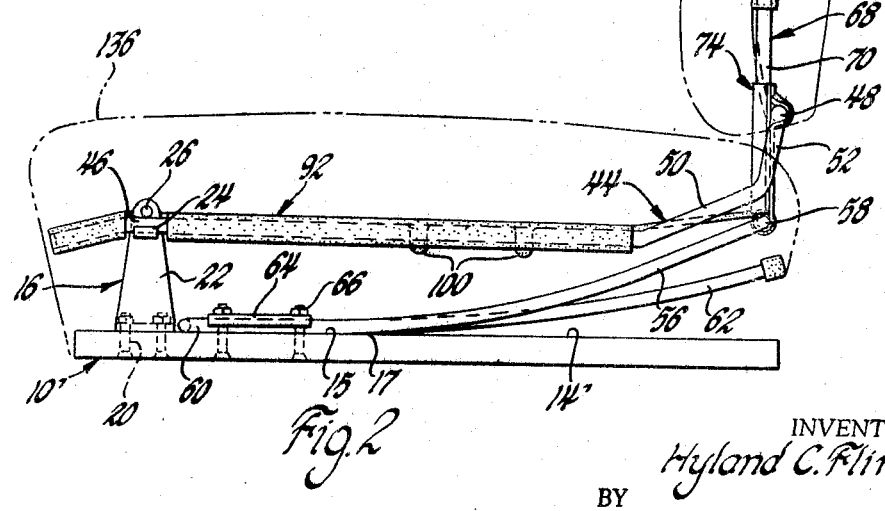
FIG. 2 is an elevational view of the seat structure illustrated in FIG. 1 in an unloaded condition and with another form of base structure.

Referring again to FIGS. 1 through 5, the U-shaped seat support wire, illustrated generally by the numeral 44, has leg portions 46 and a cross member 48, the leg portions 46 being secured in the U-shaped clips 24 pivotally mounted on the brackets 16. The seat support wire is a flexible spring steel rod having sufficient stiffness to support the weight of the person with which the seat is to be used, but at the same time providing a degree of springiness or resilience to take the place of the normal bulky spring cushions. Seat support wire 44 extends rearwardly from the brackets 16 in a substantially horizontal manner, as best illustrated in FIG. 2, to a point rearwardly of the seat structure, where the legs 46 are bent upwardly and rearwardly, as at 50, and then turn upwardly again, as at 52, to the horizontal axis of the cross member 48. Thus, the plane of the axis of cross member 48 is disposed above the plane of the pivot 26 at the forward bracket 16.

Also secured to base 10 is the second U-shaped member, a resilient suspension spring, illustrated generally by the numeral 54. Suspension spring 54 has legs 56 extending rearwardly to a cross member 58, the cross member being disposed in parallel spaced relation to the cross member 48 of the spring support wire 44. Legs 56 may be reversely bent, as at 60, and then continue rearwardly to form legs 62 for purposes to become hereinafter more apparent. At the reversely bent section 60, a channel plate 64 is received over both legs 56 and 62 and is secured to the base plate 10 by means of nut and bolt assemblies 66 to hold the spring 54 securely against the base 10.

The third U-shaped resilient element is a back support wire, illustrated generally by the numeral 68. Frame 68 has legs 70 extending upwardly to a cross member 72 at a suitable height to support the back of the person using the seat. The legs 70 of back support wire 68 are pivotally secured by connecting members, illustrated generally by the numerals 74, to the cross members 48 and 58 of the seat support element 46 and the suspension spring 56, respectively.

Connecting members 74 are best illustrated in FIGS. 6 and 7 and are shown to include two pieces, a front piece 76 and a rear piece 78. Front piece 76 has a tubular portion 80 extending into flanges 82. Tubular portion 80 snugly receives the leg 70 of the U-shaped back support wire 68. Rear piece 78 includes a tubular portion 84 extending transversely of the tubular portion 80 on front member 76, tubular portion 84 receiving the cross member 48 of the U-shaped seat support wire 44. Above tubular portion 84 is a flange 86 extending the width of flanges 82 on the front member 76. Below tubular portion 84 is a hook-shaped portion 88 which receives the cross member 58 of U-shaped suspension spring 56. The flat portion 90 between the tubular portion 84 and the hook 88 is of substantially the same width as the flanges 82 on the front piece 76; and as such, the two members 76 and 78 may be welded or otherwise secured along the adjoining flange portions.

Through the connecting members 74, legs 70 of the back support wire 68 are disposed in front of cross member 48 of the seat support wire 44, and in point contact therewith, and above cross member 58 of the suspension spring 54. Thus, suspension spring 54 supports both the seat support wire 44 and the back support wire 68 in floating relation and in such manner that substantially vertical movement of the rear of the seat structure is provided when the seat is loaded. As a person leans back on the back support wire 68, cross member 72 and legs 70 will yield a slight amount, transmitting the forces on the back support wire 68 through the seat support wire 44 to the pivot connection at the brackets 16 and thus to the base 10. A portion of the rearward pressure on back support wire 68 is also transmitted forwardly through the support spring 54 to the base 10. The connectors 74 tie together in unison action the back support wire 68 and the seat support wire 44 to maintain substantially the same angularity therebetween when the seat is occupied. The back support wire 68 and seat support wire 44 pivot about the pivot points 26 on the brackets 16 and about points adjacent the base 10 on the suspension spring 54. The pivotal connection through the connectors 74 permit the action without binding or overstressing the various parts. The pivot points are so arranged that the arcs described by the moving elements are substantially the same, thus providing vertical movements of the seat back when the seat is occupied.

Where the seat structure is used in a vehicle or other moving device, the pressure of a seated person applied to cross member 72 on the back support wire 68 causes the cross member 72 to move in a slightly oval path to compensate for acceleration, deceleration, road jolts and the like. Since the back support wire 68 is of some resilience, this support is adequately provided without the necessity of coil springs, flat wire fish mouths, or overly thick foam materials.

The reversely bent legs 62 of the spring suspension wire 54 extend rearwardly of base 10 below the legs 56 of the spring 54. In such position, the legs 62 act as a secondary pick-up for the seat structure as it is loaded, the ends of the legs 62 being engaged by the cross member 58 of the suspension spring 54. Under such conditions, spring 54 may be designed to support a particular weight which will deflect legs 56 to the point of engagement of the cross member 58 with the legs 62, and compensate for additional weight by the flexure of legs 62 when they are picked up by the cross member 58. Thus, the seat structure may be designed for variable weights of persons using the seat structure.

Figure 3:
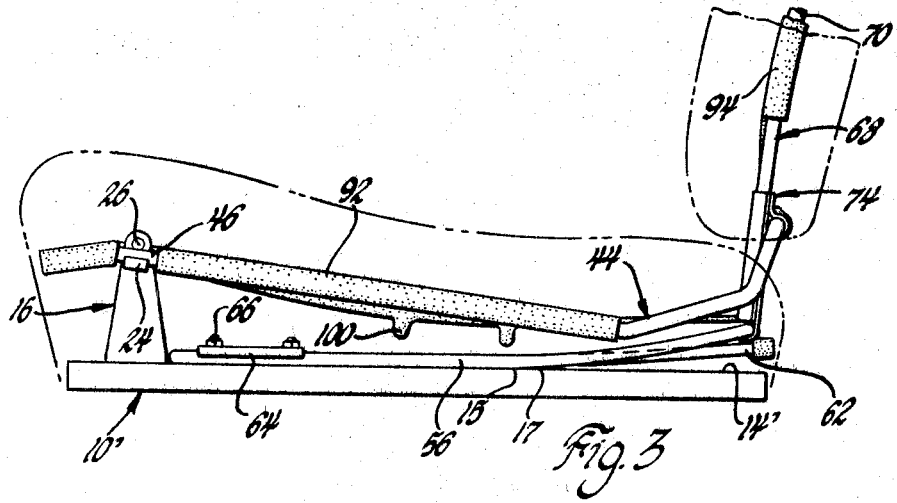
FIG. 3 is a partial view similar to FIG. 2 showing the position of the various parts when the seat is loaded.
Figure 4:
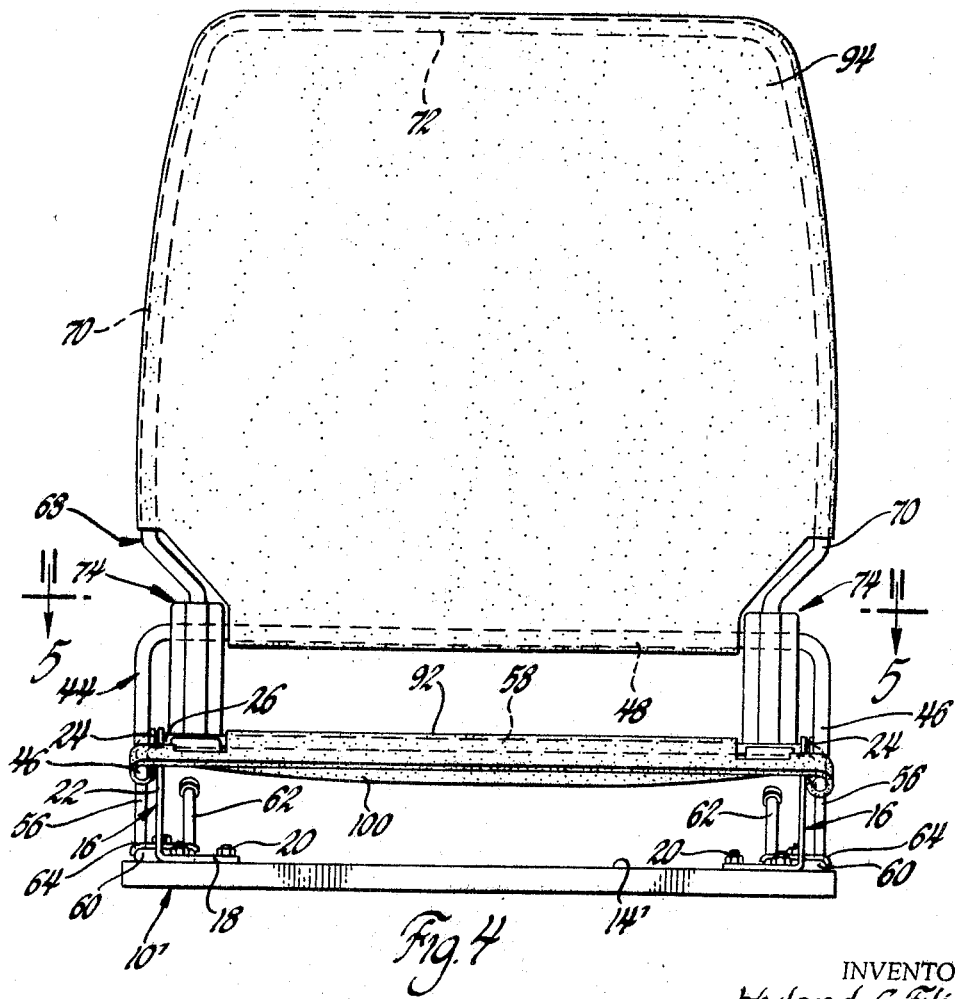
FIG. 4 is a front elevational view of the seat structure of FIGS. 2 and 3.

Reference to FIGS. 2 and 3 will indicate the variation in operation of the suspension spring 54 with a different type of base structure. For convenience, base structure 10' is formed of a rectangular platform extending rearwardly and having brackets 16 and spring 54 secured to the forward portion as hereinbefore described. Surfaces 14' underlie the legs 56 of spring 54 and when the seat is in the unloaded condition of FIG. 2 the legs engage the surfaces 14' at 15. As the seat is loaded, point 15 moves rearwardly, as illustrated in FIG. 3, thus stiffening the unsupported portions of the legs 56. This increases the resistance of spring 54 to the load for better support under certain conditions.

Pick-up spring legs 62 are subject to the same action, having an initial engagement point at 17 with the surface 14'. As the legs 62 are activated, point 17 moves rearwardly to stiffen the unsupported remainder of legs 62 for better load control.

In order to provide a seating surface on the seat support wire 44 and the back support wire 68, a sheet of flexible material, illustrated generally by the numeral 92, is provided on the seat wire 44 and a similar flexible material 99 is provided on the back support wire 68. These flexible materials may be made of metal, plastic, rubber, or cloth, or any other material which may provide flexibility with return characteristics, a bonding affinity to the frame wires, good fatigue values and other such characteristics. Along three sides of the flexible sheet 92 the material is secured to the legs 46 of the seat support wire 44 and to the cross member 58 of the suspension spring 54. This may be accomplished by wrapping the edges of the material around the wires and bonding or stapling the material to the wires or to itself. Other means of securement may be applied.

It is well known in the art that the turberosities of a seated person are two rounded bones about five inches apart transverse of the limbs. When seated, these bones are very close to the surface of the body and carry about 75 percent of the weight of the seated person. Thus, each bone has a down pressure of between fifty and eighty pounds for the average person. When seated for a long period of time, suitable means must be provided to ease the pressures, or the seating will become unpleasant. Experience has proven that the best comfort comes from a material that allows the tuberosities to penetrate to a depth of about two and one-half inches from a relatively flat surface as the weight is applied. In presently available seat cushions and the like, and particularly in vehicular uses of seats, a minimum depth of cushion must also include additional space for shock loads. In the case of flat wire springs, a depth of about four inches is required. For foam materials or the like, a depth of about five inches is desirable. Each of these materials also provide within their characteristics means for radiating the concentrated load on the tuberosities in such a manner as to prevent close wrap-around on these bones. However, in the case of a sheet-type flexible surface, such as canvas, plastics, or rubber, these materials will allow the tuberosities to penetrate into a cup-like formation such as illustrated in FIG. 9. In FIG. 9 is shown a typical material such as canvas, rubber or the like 96, and in dashed and dotted lines 98 is the diagrammatic representation of the tuberosity. As illustrated in FIG. 9, the material forms a cup-like shape around the tuberosity 98, the result of which would be a very unpleasant experience.

The flexible surface 92, as illustrated in FIGS. 2 through 5, is provided with a pair of spaced reinforcing ribs 100, extending laterally of the surface 92 and spaced on opposite sides of the A point, that is, the point at which the load of a seated person is concentrated and at which the tuberosities would be located, as illustrated by the dashed and dotted circles 102 in FIG. 5. Ribs 100 provide reinforcement for the flexible surface 92 and spread the load applied by the seated person over the entire area of the flexible surface 92. Reference is now made to FIG. 10 illustrating the flexible surface 92 with the tuberosity 98 illustrated diagrammatically thereon, showing the reinforcing ribs 100 and the manner in which the ribs prevent the cup-like formation around the tuberosity 98 as illustrated in FIG. 9.

It is to be understood that the flexible surface 92 may be provided with a pad or the like of foam or other suitable material to increase the soft feel, but such pad need not be of the considerable depth above described in order to provide optimum seating.

The flexible sheet 94 secured to the back support wire 68 is suitably attached to the legs 70 and the cross member 74 of the back support wire 68 and at its lower edge is secured to the cross member 48 of the seat support wire 44. This provides additional connection between the back support wire 68 and the seat support wire 44 for the unison action thereof.

Reference is now made to FIG. 11 to show a modified form of the seat structure, utilizing sinuous springs rather than the flexible sheet-like cushion supports as above described. In FIG. 11 the seat structure is the same as illustrated in FIGS. 1 through 5 wherein the U-shaped seat support wire 44 is secured to base 10 through the pivot brackets 16. The suspension spring 54 is also secured to the base 10 by channels 64, and the U-shaped back support wire 68 is pivotally mounted on the cross members 48 and 58 of the seat wire 44 and spring 54, respectively, through the connectors 74.

A tubular channel member 106 is received over the legs 46 of the seat support wire 44 and crimped in place to be retained securely thereon. Extending inwardly from the tube 106 are U-shaped ears 108 at spaced points along the length thereof to receive the ends of sinuous flat springs 110 extending laterally of the seat support wire 44. Springs 110 are of the well known type having oppositely disposed loops 112 connected by straight portions 114. A suitable number of such springs 110 are provided across the seat support wire 44 to provide support for the seat cushion.

Extending between the front ends of the legs 46 is a border wire 116, curved around the outside of bracket member 16 and secured to one of the loops of the forward spring 110 by a suitable clip 118. A filler wire 120 zigzags between the border wire 116 and the forward spring strip 110 and is clipped to the border wire and the spring by suitable clips 118 at the various points of connection.

In order to complete the cushion support, a pair of longitudinally extending flat wire springs 124 are secured to the base 10 by suitable clips 126 and extend upwardly and forwardly to the border wire 116 where they are secured by suitable clips 118. The springs 124 then extend rearwardly and at points of engagement with the cross springs 110 are secured thereto by clips 118. The rear ends of springs 124 are bent upwardly and rearwardly for securement to cross member 48 of the spring support wire 44 by S-shaped hooks 128.

The back support wire 68 is similarly provided with longitudinal wire springs 130 secured by S hooks 128 at the cross member 72 and S hooks 128 on the seat support wire 44. Transversely of the back support wire 68 are a second set of flat wire springs 132 secured to the legs 70 by clips or the like 118. At points of intersection with the spring strips 130, the strips 132 are secured by clips 118. The location of springs 132 is such as to provide optimum support for the small of the back of the user, and more or less springs than illustrated in FIG. 11 may be provided.

It is to be understood that a cushion material such as foam rubber or the like will be disposed over the flat wire springs on the back portion in order to provide the proper cushioning. The foam material or other material is then covered by a suitable trim material in a position such as shown by dashed and dotted lines 136 and 138 in FIG. 2. Such material 136 may be secured to the seat structure in any known and suitable manner.

Thus, a seat construction is provided which is extremely inexpensive and efficient to manufacture and assemble and yet provides the necessary resilience and support for a seated person without the usual bulk or complicated cushioning structures normally found in present seating. The resilient U-shaped seat support and back support wires provide much of the flexible support for the occupant and are so connected together as to provide unison action with the structure pivoting about pivot points located at the front of the seat and properly located as to provide substantially vertical movement of the rear of the seat when it is occupied. Seat cushion support is provided which permits the use of a minimum amount of material in order to provide comfortable and optimum seating characteristics for the occupant without excessive or undue pressures on the various parts of the body.

Numerous changes and alterations will occur to those having ordinary skill in the art after having had reference to the foregoing description and drawings. However, it is not intended to limit the invention by the foregoing, but by the scope of the appended claims.

I claim:

1. A seat comprising:
base means;
a resilient seat support means extending rearwardly from said base means;
a resilient suspension means extending rearwardly from said base means independently of said seat support means;
back support means pivotally secured to said seat support means and to said suspension means at vertically spaced positions, and secondary suspension means for engaging said suspension means when the seat is loaded to provide additional support.

2. The seat set forth in claim 1 wherein said seat support means comprises a seat support wire and said back support means comprises a back support wire, and further including cushion support means secured to said seat support wire and to said back support wire.

3. The seat set forth in claim 2 wherein said cushion support means includes a first flexible sheet secured to said seat support wire and a second flexible sheet secured to said back support wire and to said seat support wire.

4. The seat set forth in claim 3 wherein said flexible sheet secured to said seat support wire is provided with reinforcing ribs extending laterally of said seat.

5. The seat set forth in claim 4 wherein said reinforcing ribs are spaced on opposite sides of the A point of said seat.

6. The seat set forth in claim 2 wherein said cushion support means include a plurality of spring strips having oppositely disposed loops connected by straight portions, said spring strips extending laterally of said seat and being secured at the ends thereof to said seat support wire, and a plurality of spring strips having oppositely disposed loops connected by straight portions secured to said back support wire and said seat support wire.

7. The seat set forth in claim 1 wherein said secondary suspension means extends rearwardly from said base means and below said suspension means.

8. The seat set forth in claim 1 further including surface means extending rearwardly of said seat and underlying said suspension means, said suspension means engaging said means progressively rearwardly as said seat is loaded to stiffen the portion of said suspension means rearward of the engagement with said means.

9. A seat comprising:
a base;
a U-shaped resilient seat support wire;
means pivotally securing the ends of the legs of said seat support wire to said base and spaced therefrom;
a U-shaped resilient suspension spring having the ends of the legs thereof secured to said base, the cross member of said suspension wire being disposed in parallel spaced relation to the cross member of said seat support wire;
a U-shaped resilient back support wire;
means pivotally securing the legs of said back support wire to the cross members of said seat support wire and said suspension spring to permit movement of said back support wire with said seat support wire without substantial change in the angularity between said back support wire and said base.

10. The seat set forth in claim 9 and further including cushion support means secured to said seat support wire and to said back support wire.

11. The seat set forth in claim 10 wherein said cushion support means include a flexible sheet secured to the legs of said seat support wire and to the cross member of said suspension spring, and a flexible sheet secured to the legs of said back support wire and to the cross member of said seat support wire.

12. The seat set forth in claim 11 wherein said flexible sheet secured to the legs of said seat support wire is provided with reinforcing ribs extending laterally of said seat.

13. The seat set forth in claim 12 wherein said reinforcing ribs are spaced on opposite sides of the A point of said seat.

14. The seat set forth in claim 13 wherein said cushion support means include a plurality of spring strips having oppositely disposed loops connected by straight portions, said spring strips extending laterally of said seat and being secured at the ends thereof to the legs of said seat support wire, and a plurality of spring strips having oppositely disposed loops connected by straight portions extending between and secured to the cross member of said back support wire and the cross member of said seat support wire.

15. The seat set forth in claim 14 wherein said cushion support means further include a border wire extending between the forward ends of the legs of said seat support wire, and a plurality of spring strips having oppositely disposed loops connected by straight portions secured at one end to said base and secured at the other end to the cross member of said seat support wire, said last-named spring strips extending upwardly from said base and being secured to said border wire at the intersection therewith.

16. The seat set forth in claim 15 wherein said cushion support means further includes a plurality of spring strips having oppositely disposed loops connected by straight portions extending between and secured to the legs of said back support wire.

17. The seat set forth in claim 9 and further including a secondary suspension spring secured to said base and extending rearwardly thereof below said suspension spring and adapted to engage said suspension spring when said seat is loaded to provide additional support for said seat.

18. The seat set forth in claim 9 wherein the legs of said suspension spring are reversely bent and extend rearwardly and spaced from the legs and adapted to be engaged by the cross member of said suspension spring when said seat is loaded to provide additional support for said seat.

19. The seat set forth in claim 9 and further including means extending rearwardly from said base and underlying said legs of said suspension spring, said legs engaging said means progressively rearwardly as said seat is loaded to stiffen the portion of said legs rearward of the engagement with said means.

20. A seat comprising;
a base;
bracket members extending upwardly from the forward portion of said base;
a resilient seat support wire having legs pivotally secured on said bracket members, said legs extending rearwardly in spaced relation to said base and being connected at the rearward ends thereof by a cross member portion extending transversely of said seat;
a resilient suspension spring having legs secured to said base rearwardly of said bracket members, said legs extending rearwardly and being connected by a cross member portion, said cross member portion being in parallel spaced relation to said cross member portion of said seat support wire;
a resilient back support wire extending upwardly from said cross members and having legs pivotally secured to each of said cross members;
said seat support wire and said back support wire being movable downwardly against the force of said suspension spring about said pivot connection on said bracket members without substantial change in angularity between said seat support wire and said base when said back is loaded.

21. The seat set forth in claim 20 and further including cushion support means secured to said seat support wire and to said back support wire.

22. The seat set forth in claim 21 wherein said cushion support means include a flexible sheet secured to the legs of said seat support wire and to the cross member of said suspension spring, and a flexible sheet secured to the legs of said back support wire and to the cross member of said seat support wire.

23. The seat set forth in claim 22 wherein said flexible sheet secured to the legs of said seat support wire is provided with reinforcing ribs extending laterally of said seat.

24. The seat set forth in claim 23 wherein said reinforcing ribs are spaced on opposite sides of the A point of said seat.

25. The seat set forth in claim 21 wherein said cushion support means includes a plurality of spring strips having oppositely disposed loops connected by straight portions, said spring strips extending laterally of said seat and being secured at the ends thereof to the legs of said seat support wire, and a plurality of spring strips having oppositely disposed loops connected by straight portions extending between and secured to the cross member of said back support wire and the cross member of said seat support wire.

26. The seat set forth in claim 25 wherein said cushion support means further includes a border wire extending between the forward ends of the legs of said seat support wire, and a plurality of spring strips having oppositely disposed loops connected by straight portions secured at one end to said base and secured at the other end to the cross member of said seat support wire, said last-named spring strips extending upwardly from said base and being secured to said border wire at the intersection therewith.

27. The seat set forth in claim 26 wherein said cushion support means further includes a plurality of spring strips having oppositely disposed loops connected by straight portions extending between and secured to the legs of said back support wire.

28. The seat set forth in claim 20 and further including a secondary suspension spring secured to said base and extending rearwardly thereof below said suspension spring and adapted to engage said suspension spring when said seat is loaded to provide additional support for said seat.

29. The seat set forth in claim 20 wherein the legs of said suspension spring are reversely bent to provide portions extending rearwardly and spaced from the legs and adapted to be engaged by the cross member of said suspension spring when said seat is loaded to provide additional support for said seat.

30. The seat set forth in claim 20 and further including means extending rearwardly from said base and underlying said legs of said suspension spring, said legs engaging said means progressively rearwardly as said seat is loaded to stiffen the portion of said legs rearward of the engagement with said means.

31. A seat comprising:
a base;
a U-shaped resilient seat support wire pivotally supported in spaced relation on said base and extending rearwardly thereof, the cross member portion of said seat support wire being disposed rearwardly of said seat and in a plane spaced above the plane of pivotal support;
a U-shaped resilient suspension spring secured to said base and having the cross member portion thereof in parallel spaced relation and below said cross member of said seat support wire;
and a U-shaped resilient back support wire having the legs thereof pivotally secured to said cross members of said seat support wire and said suspension spring; said back support being movable with said seat support wire and with said suspension spring and pivoting about said pivot connection between said seat support wire and said base and pivoting about the flexure point of said suspension spring when said seat is loaded to maintain the angular relationship between said back support wire and said base.

32. The seat set forth in claim 31 and further including cushion support means secured to said seat support wire and to said back support wire.

33. The seat set forth in claim 32 wherein said cushion support means includes a flexible sheet secured to the legs of said seat support wire and to the cross member of said suspension spring, and a flexible sheet secured to the legs of said back support wire and to the cross member of said seat support wire.

34. The seat set forth in claim 33 wherein said flexible sheet secured to the legs of said seat support wire is provided with reinforcing ribs extending laterally of said seat.

35. The seat set forth in claim 34 wherein said reinforcing ribs are spaced on opposite sides of the A point of said seat.

36. The seat set forth in claim 32 wherein said cushion support means include a plurality of spring strips having oppositely disposed loops connected by straight portions, said spring strips extending laterally of said seat and being secured at the ends thereof to the legs of said seat support wire, and a plurality of spring strips having oppositely disposed loops connected by straight portions extending between and secured to the cross member of said back support wire and the cross member of said seat support wire.

37. The seat set forth in claim 36 wherein said cushion support means further include a border wire extending between the forward ends of the legs of said seat support wire, and a plurality of spring strips having oppositely disposed loops connected by straight portions secured at one end to said base and secured at the other end to the cross member of said seat support wire, said last-named spring strips extending upwardly from said base and being secured to said border wire at the intersection therewith.

38. The seat set forth in claim 37 wherein said cushion support means further includes a plurality of spring strips having oppositely disposed loops connected by straight portions extending between and secured to the legs of said back support wire.

39. The seat set forth in claim 31 and further including a secondary suspension spring secured to said base and extending rearwardly thereof below said suspension spring and adapted to engage said suspension spring when said seat is loaded to provide additional support for said seat.

40. The seat set forth in claim 31 wherein the legs of said suspension spring are reversely bent to provide portions extending rearwardly and spaced from the legs and adapted to be engaged by the cross member of said suspension spring when said seat is loaded to provide additional support for said seat.

41. The seat set forth in claim 31 and further including means extending rearwardly from said base and underlying said legs of said suspension spring, said legs engaging said means progressively rearwardly as said seat is loaded to stiffen the portion of said legs rearward of the engagement with said means.

References Cited

UNITED STATES PATENTS

| | | | |
|---|---|---|---|
| 1,767,757 | 6/1950 | Harris | 297—309 X |
| 3,059,967 | 10/1962 | Flint | 297—309 |
| 3,071,413 | 1/1963 | Flint et al. | 297—309 X |
| 2,100,476 | 11/1937 | Flint | 297—307 |
| 2,309,881 | 2/1943 | Wise | 297—296 |
| 2,346,414 | 4/1944 | Carpenter | 297—309 |

FOREIGN PATENTS 464,667   4/1937   Great Britain.

BOBBY R. GAY, Primary Examiner

G. O. FINCH, Assistant Examiner

U.S. Cl. X.R.

297—285, 340